(12) United States Patent
Home

(10) Patent No.: US 7,475,632 B2
(45) Date of Patent: Jan. 13, 2009

(54) SMOKELESS BARBECUE GRILL

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 0 days.

(21) Appl. No.: 11/459,938

(22) Filed: Jul. 26, 2006

(65) Prior Publication Data

US 2008/0034982 A1    Feb. 14, 2008

(51) Int. Cl.
*A47J 37/00* (2006.01)
(52) U.S. Cl. .............................. 99/446; 99/400; 99/401; 99/447; 99/450; 126/41 R; 126/9 R
(58) Field of Classification Search .................. 99/339, 99/340, 372–384, 330, 444–450, 389–402, 99/451; 126/25 R, 41 R, 51, 9 R, 20, 40, 126/50, 34; 392/422; 219/40, 400, 401
See application file for complete search history.

(56) References Cited

U.S. PATENT DOCUMENTS

| | | | | |
|---|---|---|---|---|
| 3,152,242 A | * | 10/1964 | De Mott | 392/416 |
| 3,154,004 A | * | 10/1964 | Huck | 99/390 |
| 4,632,089 A | * | 12/1986 | Wardell | 126/25 R |
| 4,850,333 A | * | 7/1989 | Dellrud et al. | 126/25 A |
| 4,878,477 A | * | 11/1989 | McLane | 126/41 R |
| 5,189,945 A | * | 3/1993 | Hennick | 99/339 |
| 5,381,729 A | * | 1/1995 | Hennessy et al. | 99/483 |
| 6,935,329 B2 | * | 8/2005 | Han et al. | 126/41 R |

* cited by examiner

*Primary Examiner*—Timothy F. Simone
(74) *Attorney, Agent, or Firm*—Leong C. Lei

(57) ABSTRACT

An infrared barbecue grill which includes a body, a pair of infrared burners, a first shield member, a first baffle installed on the outer edge of the first shield member, a second shield member, a second baffle having a first edge installed on the outer edge of the second shield and having a lug, a grate placed on the body, a heat dissipator arranged on a bottom of the body, and a water basin mounted under the heat dissipator, whereby the baffles will guide the heat through the holes thereon to the region of the grate where the infrared ray emitted from the infrared burners cannot cover, the lug will prevent the rear infrared burner from emitting infrared rays directly to the user, and the water basin will provide water vapor to add moisture to the food on the grate thereby making the food juicy and delicious to eat.

5 Claims, 6 Drawing Sheets

SMOKELESS BARBECUE GRILL

CROSS-REFERENCE

This application is related to the patent application, Ser. No. 11/268,539, filed Nov. 8, 2005, now abandoned.

BACKGROUND OF THE INVENTION (a) Field of the Invention

The present invention relates to a smokeless barbeque grill, and in particular to one which utilized infrared ray to heat the food on the grate and a water basin to produce water vapor to add moisture to the food thereby making it juicy and delicious to eat.

(b) Brief Description of the Prior Art

Ever since mankind's realization of how to control fire for the purposes of providing heat and light, the cooking behavior of grilling food has continuously become popularized along with the historical development of human beings. Even with the availability of the electric grill, inconvenience remains as a main issue when trying to grill meat and other foods, where the total grilling time has to be set in advance and the accuracy of the time set relies mostly from past grilling experiences. As the electric grill does not allow people to frequently open it to check the cooking status of the food, most people prefer using conventional charcoal grills, with an open grilling space provided on the top of the upper grate of the grill. When using the conventional charcoal grill for grilling, the fat from the food and the BBQ sauce poured onto the meat, drips through the grate easily, which puts out the burned charcoal briquettes—lowering the heat necessary to cook food—and further creates smoke—mixed with the gas of oil and ashes—that is harmful to the human respiratory system and also causes environmental problems.

As commonly known, the charcoal briquettes, when burned, will transform into embers radiating the heat and providing the highest grilling efficiency and the highest heat temperature right above it. Even when placing the charcoal briquettes away from the center of the grill to prevent the dripping of fat from the food or BBQ sauce from spilling onto the briquettes, the flame created from burning the charcoal briquettes still rises from the center of the grill, and fails to effectively cook the food that is off to the side or off-center. It is unavoidable to place the charcoal briquettes right beneath the grilling food when using the charcoal grill. Thus, when using the conventional charcoal grill, the resulted grilling smoke inevitably contaminates the grilled food, environment and also creates harmful effects to the human respiratory systems.

Some people think that the smoke—created from the burning of the charcoal—added to the skin of the meats make the grilled meat taste better, as the smoke makes it skin crispy. Nonetheless, this viewpoint is not appropriate. The food itself can be tasty when grilled with appropriate fire control; the tastiness of the food should not unnecessarily rely on the smoke added to its skin. Moreover, people nowadays are aware of the fact that the smoke of charcoal contains small amount of carcinogenic substances. Grilling food with higher exposure to the smoke does more harm to the human body. The problem of the grilling smoke is, thus, not just a matter of personal preferences, it relates further to the problem of a healthy diet, and should be eliminated.

Therefore, it is an object of the present invention to provide an improvement in the structure of a barbecue grill which can obviate and mitigate the above-mentioned drawbacks.

SUMMARY OF THE INVENTION

This invention is related to an improvement in the structure of a barbecue grill.

It is the primary object of the present invention to provide an infrared barbecue grill wherein heat is evenly distributed on the top of the grate.

It is another object of the present invention to provide an infrared barbecue grill which can prevent the user from direct heating from the infrared burner.

It is a further object of the present invention to provide an infrared barbecue grill which has a water basin for adding moisture to the food on the grate thereby making the food juicy and delicious to eat.

According to the preferred embodiment of the present invention, there is provided an infrared barbecue grill which includes a body having an open top, the body having an interior with an inner front side and an inner rear side, a first infrared burner arranged at the inner front side, a second infrared burner arranged at the inner rear side and located opposite to the first infrared burner, a first shield member mounted above the first infrared burner and having a plurality of through holes, the first shield member having an inner edge mounted on the inner front side of the body and an outer edge suspended from the inner front side of the body, a first baffle having a first edge fixedly installed on the outer edge of the first shield and a second edge having a distance from the first shield member, a second shield member mounted above the second infrared burner and having a plurality of through holes, the second shield member having an inner edge mounted on the inner rear side of the body and an outer edge suspended from the inner rear side of the body, a second baffle having a first edge fixedly installed on the outer edge of the second shield and a second edge having a distance from the second shield member, a grate configured to be placed on the open top of the body, a heat dissipator arranged on a bottom of the body and formed with a plurality of through holes, and a water basin slidably mounted under the heat dissipater, whereby the baffles will guide the heat through the holes thereon to the region of the grate where the infrared ray emitted from the infrared burners cannot cover, the lug will prevent the rear infrared burner from emitting infrared rays directly to the user, and the water basin will provide water vapor to add moisture to the food on the grate thereby making the food juicy an delicious to eat.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
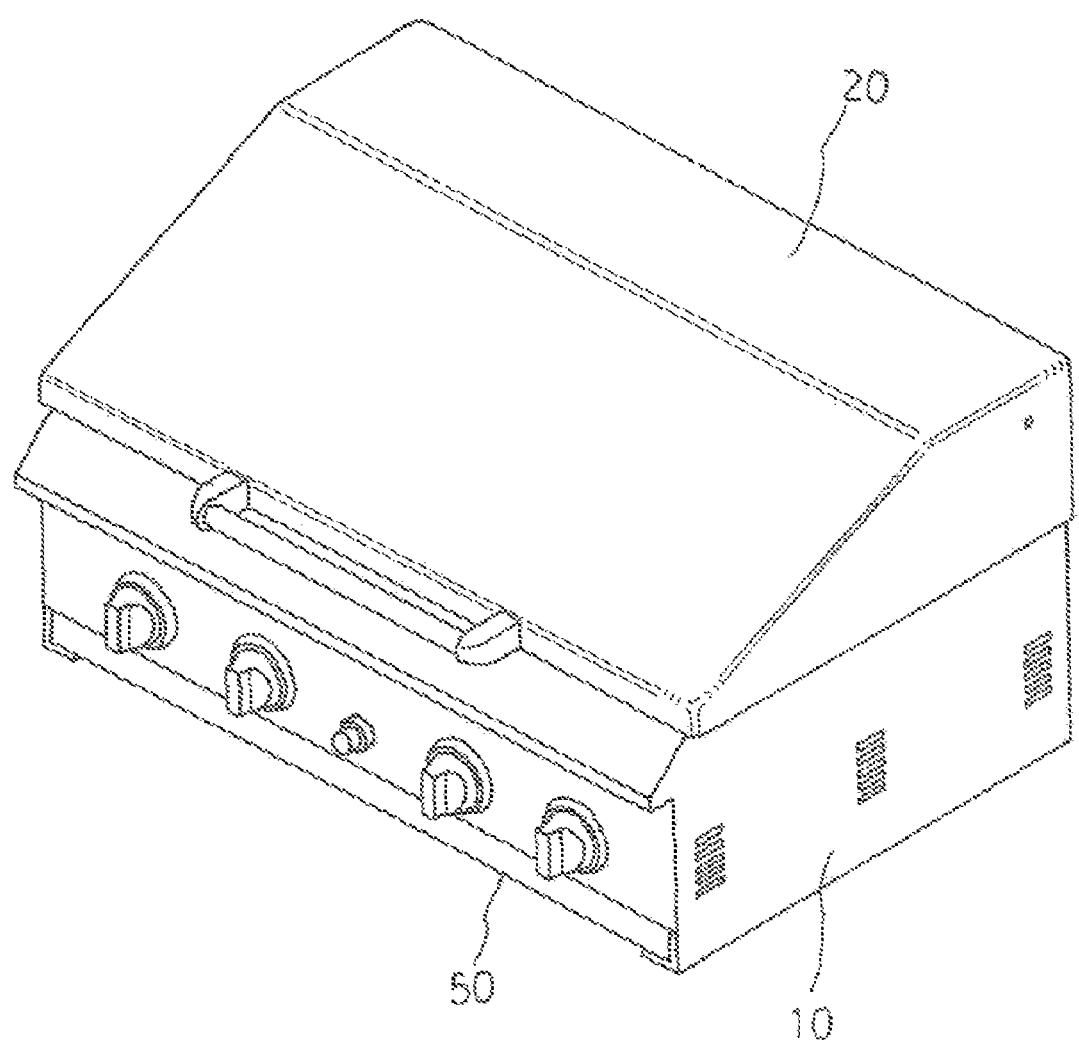
FIG. 1 is a perspective view of an infrared barbecue grill according to the present invention.
Figure 2:
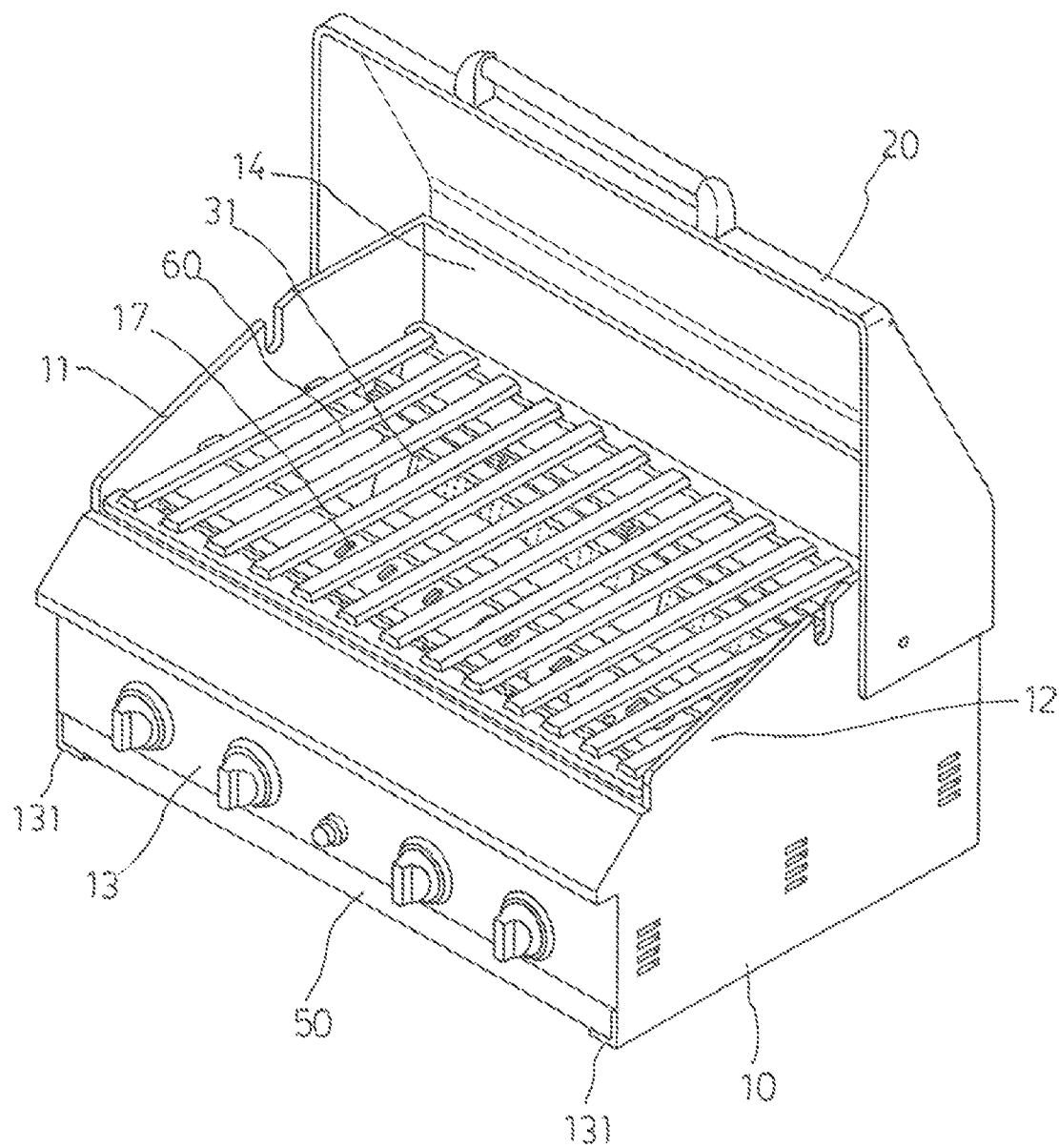
FIG. 2 is a perspective view of the infrared barbecue grill according the present invention, with the lid opened.
Figure 3:
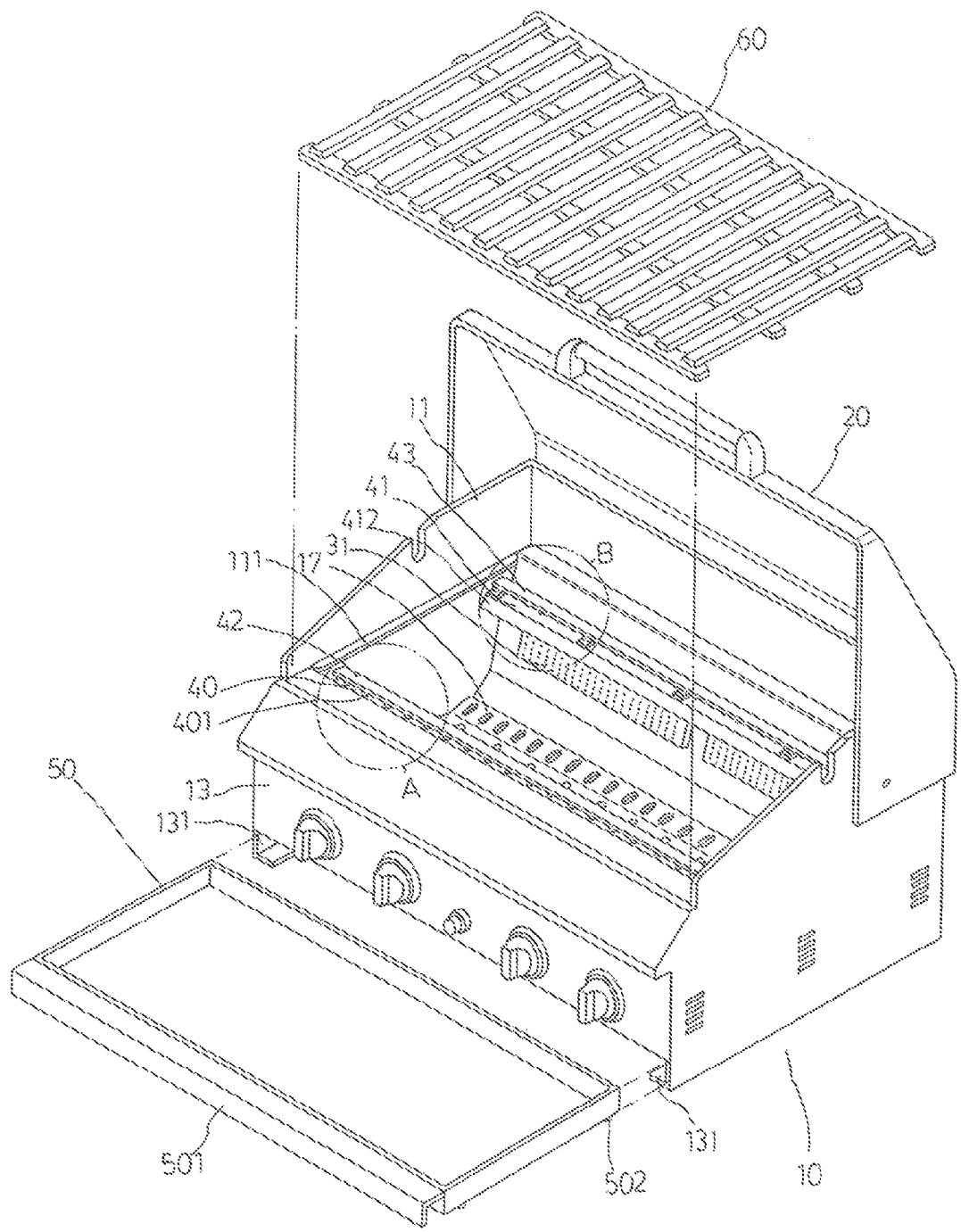
FIG. 3 is an exploded view of the infrared barbecue grill according to the present invention.
Figure 4:
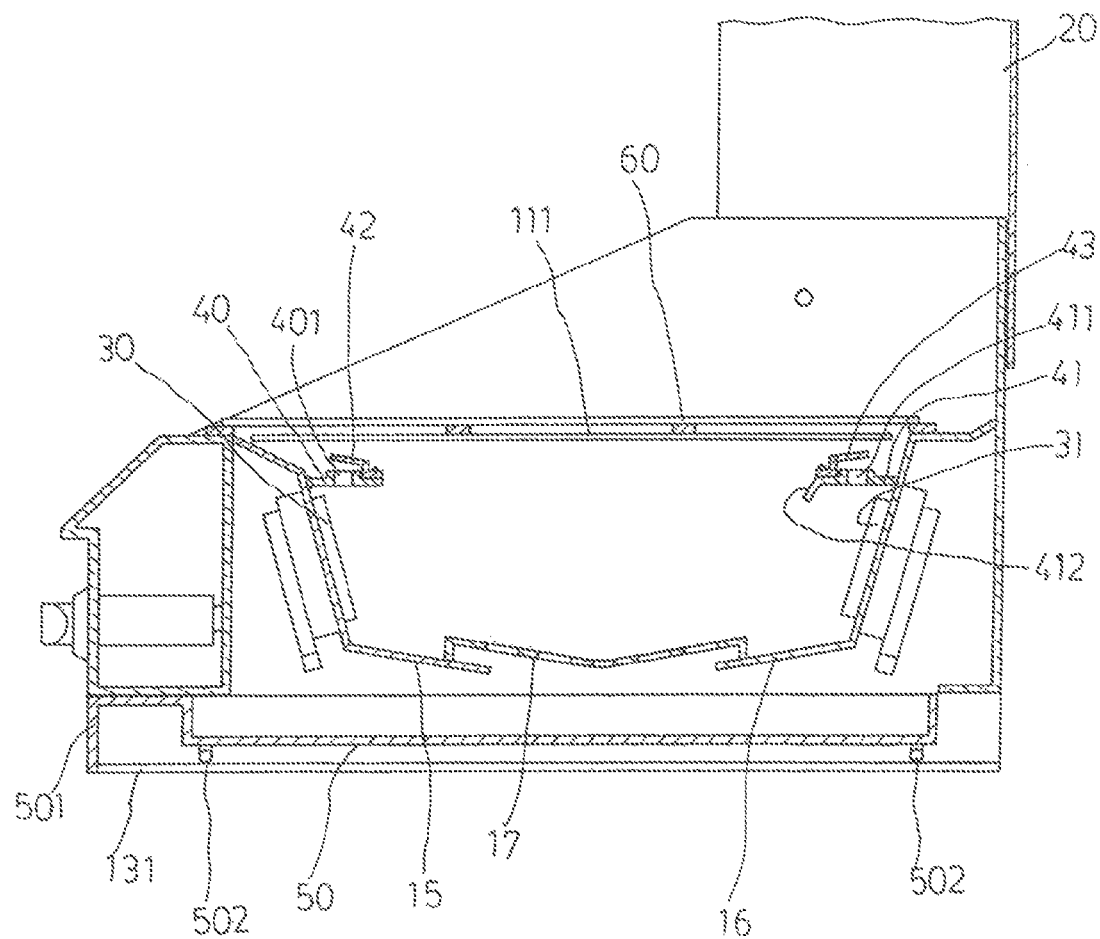
FIG. 4 is a sectional view of the infrared barbecue grill according to the present invention.
Figure 5A:
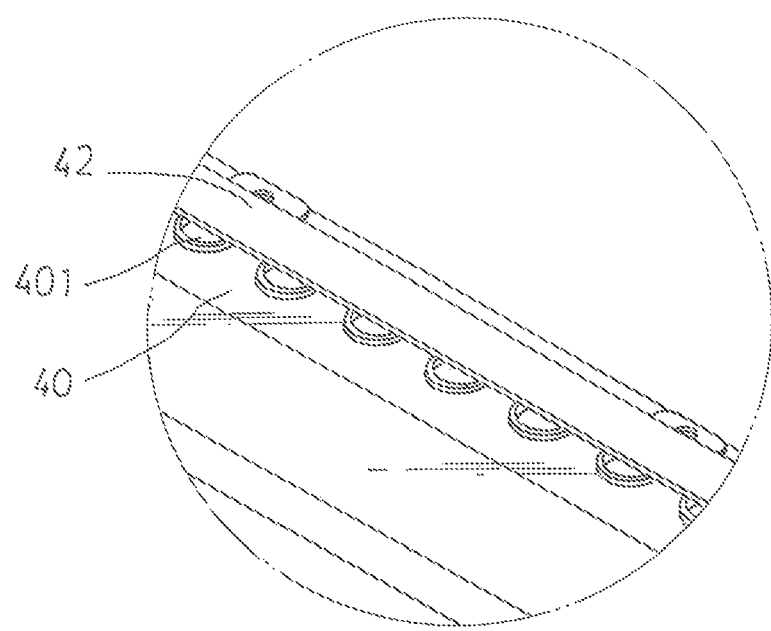
FIG. 5A is an enlarged view of the portion A of FIG. 3.
Figure 5B:
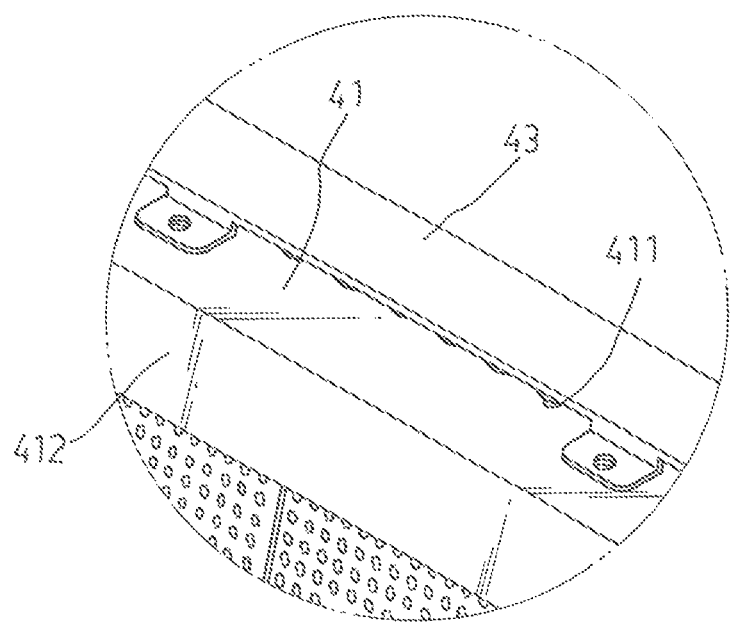

Referring to FIGS. 1, 2 and 3, the infrared barbecue grill according to the present invention generally comprises a body 10, a lid 20, at least two infrared burners 30, two shield members 40 and 41, a water basin 50 and a grate 60. The body has a front panel 13 on which are mounted control knobs (shown but not numbered), a raised back panel 14, and two slanted side panels 11 and 12 connecting the raised back panel 14 and the front panel 13. The body 10 is open at the top and the lid 20 is pivotally connected with two side panels 11 and 12 of the body 10 for closing the open top. The open top of the body 10 is provided at two inner sides with two elongated members 111 for supporting the grate 60. As shown in FIGS. 4 and 5, the front and rear infrared burners 30 and 31 are oppositely arranged at the front and rear sides of the interior of the body 10 and are fastened to the side panels 11 and 12 of the body 10.

Figure 6:
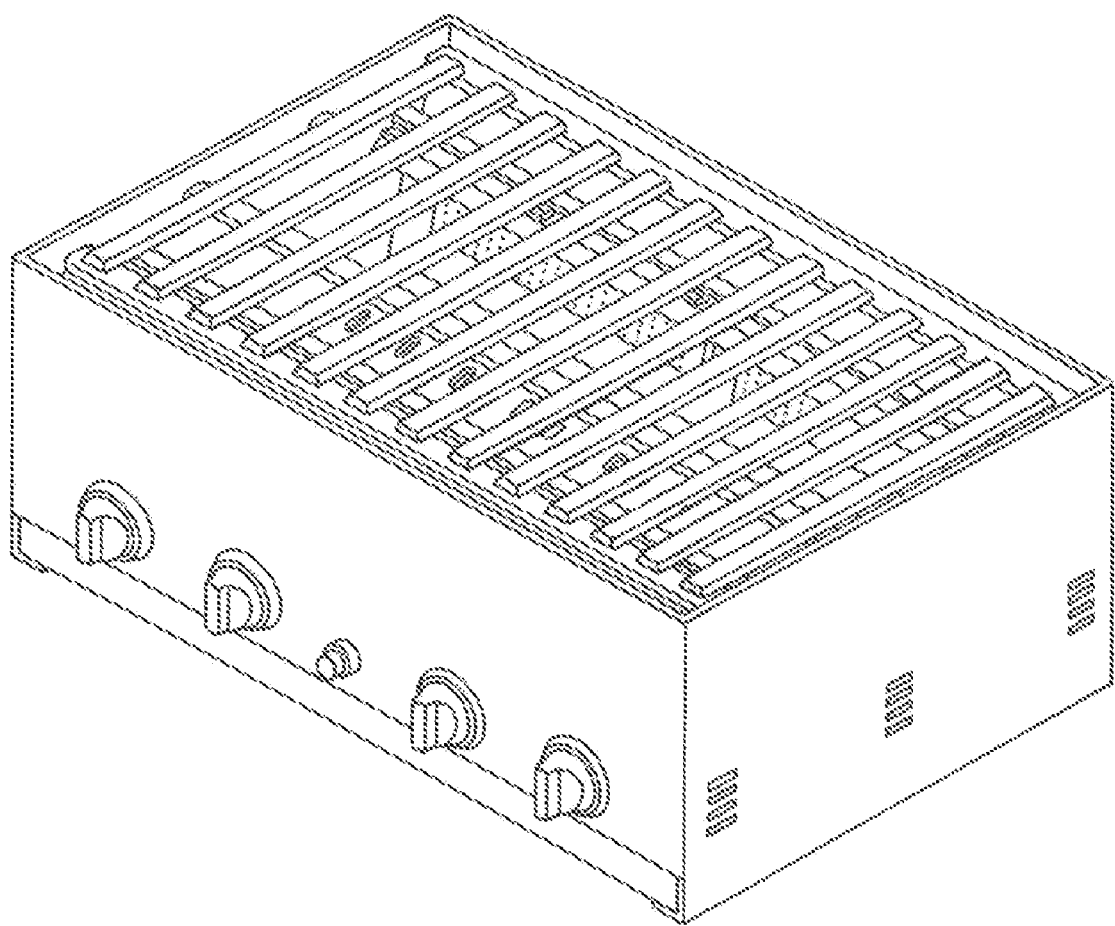
FIG. 6 is a perspective view of another preferred embodiment of the present invention.

The front and rear infrared burners 30 and 31 are arranged so that the emitting sides of the burner 30 and 31 are slantingly facing the central portion of the bottom of the grate 60. The infrared burners 30 and 31 are mounted outside an effective cooking portion of the grate 60 so that the oil, sauce and the like separated from the food will not drip onto the burners 30 and 31. Above the burners 30 and 31 there are arranged the first and second shield members 40 and 41 which are mounted across the two side panels 11 and 12 of the body 10. The shield members 40 and 41 are respectively provided with a plurality of through holes 401 and 411 which may be of any desired shape. The outer edge of a first baffle 42 is fixedly installed on the outer edge of the first shield member 40. The inner edge of the first baffle 42 has a distance from the first shield member 40 thereby guiding the heat energy generated from the infrared burner 30 to flow to the front side of the grate 60. Similarly, the outer edge of a second baffle 43 is fixedly installed on the outer edge of the second shield member 41, and the inner edge of the second baffle 42 has a distance from the second shield member 41 thereby guiding the heat energy generated from the infrared burner 31 to flow to the rear side of the grate 60. As a consequence, the baffles 42 and 43 will guide the heat through the holes to the region of the grate 60 where the infrared ray emitted from the infrared burners 30 and 31 cannot cover and so heat can be evenly distributed on the top surface of the grate 60. The second shield member 41 at the rear side is formed with a downwardly extending lug 412 for preventing the user from direct heating from the infrared burner 31. The bottom of the body has two opposite shoulder portions 15 and 16 between which there is an opening. A heat dissipator 17 is mounted across the two shoulder portions 15 and 16 for lowering the temperature of the oil and/or sauce separated from the food on the grate 60. The heat dissipator 17 is formed with a plurality of holes for the passage of oil and/or sauce. The water basin 50 which is provided with a front side 501 and rollers 502 is slidably fitted at the lower portion of the body 10 and located under the heat dissipator 17 for receiving the oil and/or sauce dropping through the holes of the heat dissipator 17. FIG. 6 illustrates another preferred embodiment of the present invention, wherein the barbecue grill has a flat top and does not have a lid.

By means of the infrared barbecue grill according to the present invention, the burners 30 and 31 are arranged at angular positions under the front and rear sides of the grate 60 thereby concentrating the heat generated from the burners 30 and 31 to the food placed on the grate 60. The hole 401 and 411 of the shield members 40 and 41 enable the heat generated from the burners 30 and 31 to flow upwardly therethrough, and the baffles 42 and 43 are designed to guide the heat passing through the holes 401 and 411 to the front and rear sides of the grate 60 thereby evenly distributing heat energy to the top surface of the grate 60 and therefore making it more convenient to use. Furthermore, the baffles 42 and 43 of the shield members 40 and 41 can prevent the oil and/or sauce separated from the food from dripping onto the burners 30 and 31.

Moreover, the water in the water basin 50 will be evaporated when the barbecue grill is in use, thereby adding moisture the food being cooked on the grate 60 and therefore making it juicy and delicious to eat.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An infrared barbecue grill comprising:
    a body having an open top, said body having an interior with an inner front side and an inner rear side;
    a first infrared burner mounted at said inner front side;
    a second infrared burner mounted at said inner rear said and located opposite to said first infrared burner;
    a first shield member mounted above said first infrared burner and having a plurality of through holes, said first shield member having an inner edge mounted on said inner front side of said body and an outer edge suspended from said inner front side of said body;
    a first baffle having a first edge fixedly installed on said outer edge of said first shield and a second edge having a distance from said first shield member;
    a second shield member mounted above said second infrared burner and having a plurality of through holes, said second shield member having an inner edge mounted on said inner rear side of said body and an outer edge suspended from said inner rear side of said body, said second shield member having a lug extending downwardly from said outer edge of said shield member;
    a second baffle having a first edge fixedly installed on said outer edge of said second shield and a second edge having a distance from said second shield member;

a grate configured to be placed on said open top of said body;

said first and second infrared burners being mounted outside an effective cooking portion of said grate;

a heat dissipator mounted on a bottom of said body and formed with a plurality of through holes; and a water basin slidably mounted under said heat dissipator;

whereby said through holes of said heat dissipator will allow passage of oil and/or grease to said water basin and allow passage of steam generated from said water basin thereby adding moisture to the food being cooked on said grate, and said baffles will guide heat energy generated from said burners to front and rear sides of said grate thereby guiding heat energy to a region of said grate where infrared ray emitted from said burners cannot cover and therefore causing the heat energy to be evenly distributed on a top surface of said grate.

2. The infrared barbecue grill as claimed in claim 1, wherein said infrared burners are arranged at an angular position, facing against a central portion of said grate.

3. The infrared barbecue grill as claimed in claim 1, wherein said first and second shield member are integrally formed with said inner front and inner rear sides of said body.

4. The infrared barbecue grill as claimed in claim 1, wherein said first baffle and second baffle are integrally formed with said first and second shield members respectively.

5. The infrared barbecue grill as claimed in claim 1, wherein said body has a front panel provided with control knobs.

* * * * *